United States Patent
Yan et al.

(10) Patent No.: US 11,021,402 B2
(45) Date of Patent: Jun. 1, 2021

(54) METHOD OF PREPARING CARBON FIBER REINFORCED CARBON-SILICON CARBIDE COMPOSITE PART

(71) Applicant: Huazhong University of Science and Technology, Wuhan (CN)

(72) Inventors: Chunze Yan, Wuhan (CN); Wei Zhu, Wuhan (CN); Hua Fu, Wuhan (CN); Zhongfeng Xu, Wuhan (CN); Yusheng Shi, Wuhan (CN); Chenhui Li, Wuhan (CN); Jiamin Wu, Wuhan (CN); Shifeng Wen, Wuhan (CN); Zhaoqing Li, Wuhan (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 0 days.

(21) Appl. No.: 16/503,613

(22) Filed: Jul. 4, 2019

(65) Prior Publication Data

US 2019/0330119 A1  Oct. 31, 2019

Related U.S. Application Data

(63) Continuation-in-part of application No. PCT/CN2018/078258, filed on Mar. 7, 2018.

(30) Foreign Application Priority Data

Apr. 13, 2017 (CN) .......................... 201710238622.1

(51) Int. Cl.
*C04B 35/565* (2006.01)
*C04B 35/622* (2006.01)
*C04B 35/80* (2006.01)

(52) U.S. Cl.
CPC .......... *C04B 35/565* (2013.01); *C04B 35/622* (2013.01); *C04B 35/806* (2013.01);
(Continued)

(58) Field of Classification Search
CPC ... C04B 35/565; C04B 35/622; C04B 35/806; C04B 35/80; C04B 35/83;
(Continued)

(56) References Cited

U.S. PATENT DOCUMENTS

2017/0266882 A1* 9/2017 Yan .......................... B29B 11/14

FOREIGN PATENT DOCUMENTS

CN  104496508 A  *  4/2015  ..... C04B 2235/6026
CN  104647760 A  *  5/2015  ............. B29B 11/14

* cited by examiner

*Primary Examiner* — Noah S Wiese
(74) *Attorney, Agent, or Firm* — JCIPRNET

(57) ABSTRACT

A method of preparing a C/C-SiC composite part, including: preparing, using a solvent evaporation process, carbon fiber composite powders coated with a phenol resin; according to a three-dimensional model of a to-be-prepared part, forming a green part corresponding to the to-be-prepared part using the carbon fiber composite powders and a 3D printing technology; densifying the green part to yield a C/C porous body having a density of 0.7 to 1.1 g/cm$^3$ and an open porosity of 30 to 50%; and siliconizing the C/C porous body under vacuum, removing excess silicon to yield a primary carbon fiber reinforced carbon-silicon carbide (C/C-SiC) body, densifying the primary C/C-SiC body, to obtain a final C/C-SiC composite part.

12 Claims, 1 Drawing Sheet

(52) U.S. Cl.
CPC ........... *C04B 2235/3826* (2013.01); *C04B 2235/5252* (2013.01); *C04B 2235/6026* (2013.01); *C04B 2235/616* (2013.01); *C04B 2235/77* (2013.01)

(58) Field of Classification Search
CPC .... C04B 2235/3826; C04B 2235/5252; C04B 2235/616; C04B 2235/5248; B33Y 80/00; B33Y 10/00
See application file for complete search history.

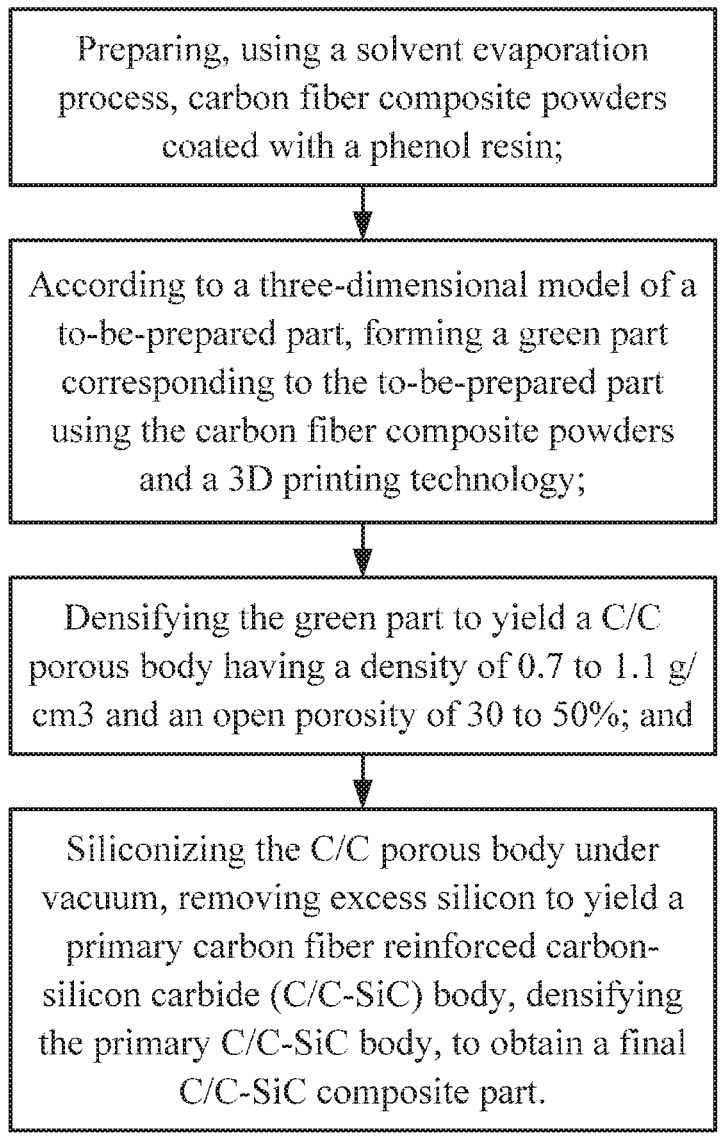

METHOD OF PREPARING CARBON FIBER REINFORCED CARBON-SILICON CARBIDE COMPOSITE PART

CROSS-REFERENCE TO RELATED APPLICATIONS

This application is a continuation-in-part of International Patent Application No. PCT/CN2018/078258 with an international filing date of Mar. 7, 2018, designating the United States, now pending, and further claims foreign priority benefits to Chinese Patent Application No. 201710238622.1 filed Apr. 13, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of composite materials, and more particularly to a method of preparing a carbon fiber (CF) reinforced carbon-silicon carbide (C/C-SiC) composite part.

The structural form of carbon fibers of carbon fiber reinforced C/C-SiC composites includes continuous carbon fibers and short carbon fibers. The short carbon fiber reinforced C/C-SiC composites are widely used due to cost advantages. Conventionally, the short carbon fiber reinforced porous composite parts are prepared by a molding process. However, the molding process is inefficient in fabricating complex parts.

Based on the principle of layer-by-layer processing and superposition, 3D printing technology can prepare complex structures, such as silicon carbide parts. However, the prepared silicon carbide parts contain a relatively large amount of residual silicon, which adversely affects their properties.

SUMMARY

Disclosed is a method for preparing C/C-SiC composite parts and products comprising the same. The method involves the preparation of carbon fiber composite powders by a solvent evaporation process, 3D printing technology, and two densification processes. The prepared composite powders have uniform particle size; the parts are very close to the final (net) shape thus reducing the need for surface finishing, and contain a relatively small amount of residual silicone.

The disclosure provides a method of preparing a C/C-SiC composite part, the method comprising:

(a) preparing, using a solvent evaporation process, carbon fiber composite powders coated with a phenol resin;

(b) according to a three-dimensional model of a to-be-prepared part, forming a green part corresponding to the to-be-prepared part using the carbon fiber composite powders and a 3D printing technology;

(c) densifying the green part to yield a C/C porous body having a density of 0.7 to 1.1 $g/cm^3$ and an open porosity of 30 to 50%; and (d) siliconizing the C/C porous body under vacuum, removing excess silicon to yield a primary carbon fiber reinforced carbon-silicon carbide (C/C-SiC) body, densifying the primary C/C-SiC body, to obtain a final C/C-SiC composite part.

The solvent evaporation process in (a) is carried out as follows:

(a1) dissolving a thermoplastic phenol resin comprising 7-10 wt. % of a curing agent in an organic solvent, adding carbon fiber powders to the organic solvent to yield a dispersed solution; where the volume ratio of the carbon fiber powders to the phenolic resin is (2-8):(2-8); and (a2) distilling the dispersed solution and crystallizing to yield a powder aggregate, and drying, grinding and sieving the powder aggregate to yield the carbon fiber composite powders.

The carbon fiber powders in (a1) has a diameter of 6 to 10 μm and a length of 50 to 200 μm.

The particle size of the carbon fiber composite powders is between 10 and 150 μm.

The 3D printing technology in (b) is a powder bed-based 3D printing technique such as selective laser sintering (SLS) technique or three-dimensional printing (3DP) technique.

Densifying the green part in (c) comprises impregnation, curing and carbonization; the impregnation is carried out under vacuum or under negative pressure, and the impregnation liquid is a thermosetting phenolic resin or a furan resin liquid having a dynamic viscosity of less than 50 millipascal-second (mPa·s), or an alcohol solution of a thermosetting phenolic resin having a dynamic viscosity of less than 20 mPa·s.

The densifying the C/C porous body in (d) comprises depositing SiC in the pores formed during the process of removal of silicon by a chemical vapor infiltration method.

The disclosure also provides a C/C-SiC composite part produced by the above-mentioned method.

Advantages of the method of preparing a carbon fiber reinforced carbon-silicon carbide (C/C-SiC) composite part in the disclosure are summarized as below:

1. The solvent evaporation process is employed to prepare the carbon fiber composite powder suitable for 3D printing process, and the powder is coated with the phenol resin. The carbon fibers are evenly distributed in the composite powder, so that the shrinkage thereof is uniform in the subsequent curing and carbonization process, thus preventing the crack and deforming of the composite powders. The surface of the carbon fibers is coated by a phenolic resin layer, which can prevent the damage to the carbon fiber in the subsequent siliconization process.

2. The C/C-SiC composite parts are prepared by 3D printing technology, which involves no molds, thus reducing the design time and preparation cost and meanwhile increasing the freedom in the part design 3. The C/C porous body is densified, and the porosity thereof is adjustable. The prepared composite parts are very close to the final (net) shape.

4. The C/C-SiC parts contain relatively low residual silicon, have relatively high density, and exhibit high-temperature mechanical properties.

BRIEF DESCRIPTION OF THE DRAWINGS

The invention is described hereinbelow with reference to accompanying drawings, in which the sole figure is a flow chart showing a method of preparing a carbon fiber reinforced carbon-silicon carbide (C/C-SiC) composite part as described in the disclosure.

DETAILED DESCRIPTION

To further illustrate, examples detailing a method of preparing a carbon fiber reinforced carbon-silicon carbide (C/C-SiC) composite part are described below. It should be noted that the following examples are intended to describe and not to limit the description.

The sole figure is a flow chart showing a method of preparing a carbon fiber reinforced carbon-silicon carbide (C/C-SiC) composite part. As shown in the sole figure, a method for preparing a C/C-SiC composite part and a product comprising the same, the method comprising the following steps:

(a) preparing, using a solvent evaporation process, carbon fiber composite powders coated with a phenol resin; the specific process is carried out as follows:

(a1) dissolving the thermoplastic phenolic resin containing 7-10 wt. % urotropine in an acetone solvent to form a dispersion solution, where the mass ratio of the resin to the solvent is 1:1;

(a2) adding a carbon fiber powder to the dispersion solution prepared in (a1), and uniformly dispersing the carbon fiber powder by ultrasonication, where the volume ratio of the carbon fiber powder to the phenolic resin is (2-8):(2-8);

(a3) distilling the dispersed solution and crystallizing to yield a powder aggregate, and recovering the solvent; and (a4) drying, grinding and sieving the powder aggregate to yield the carbon fiber composite powders.

The preparation of material is critical to the 3D printing process. The solvent evaporation process is employed to prepare carbon fiber/phenolic resin composite powder suitable for 3D printing process. The carbon fiber is used as a reinforcement, the thermoplastic phenolic resin is used as a binder, and the urotropine is a curing agent. The thermoplastic phenolic resin and the urotropine are uniformly coated on the surface of the carbon fiber powder. This is beneficial to prevent segregation of components during storage and transportation; and the product shrinks evenly during 3D printing, curing and carbonization, and is not easily deformed and cracked. In addition, the carbonization of the phenolic resin layer coated on the surface of the carbon fiber can prevent the subsequent siliconization process from causing damage to the carbon fiber.

The fibers used in the disclosure have a diameter of 6 to 10 μm and a length of 50 to 200 μm. Generally, the longer the fiber length, the better the reinforcement, but the quality of the powder coating will be adversely affected when the fiber length exceeds 150 microns. To secure the effect of laying the powder bed, the particle diameter of the carbon fiber/phenolic resin composite powder in the disclosure is mainly in the range of 10 to 150 μm.

(b) According to a three-dimensional model of a to-be-prepared part, forming a green part corresponding to the to-be-prepared part using the carbon fiber composite powders and a 3D printing technology.

Considering the shrinkage ratio of the parts during the machining process, the shrinkage of the CAD model is compensated. The carbon fiber green part is formed through a powder bed-based 3D printing technology such as SLS or 3DP.

(c) Sequentially impregnating the carbon fiber green part in a thermosetting resin, curing and carbonizing, repeating the impregnating, curing and carbonizing until a C/C porous body having a density of 0.7 to 1.1 g/cm$^3$ and a porosity of 30 to 50% is obtained.

The carbon fiber green part formed by 3D printing has a large porosity and a low strength. If the green part is directly carbonized and siliconized, it is easy to cause high residual silicon content and even damage the parts. The disclosure selects the thermosetting resin having a high carbon residue ratio for impregnation and carbonization, thus effectively regulating the strength and the pore structure of the C/C porous body.

To facilitate the impregnation, curing and carbonization of the carbon fiber green part, the impregnation, curing, and carbonization are performed under the following conditions.

The employed impregnation liquid is a thermosetting phenolic resin or furan resin having a high residual carbon ratio, the dynamic viscosity is less than 50 mPa·s, and the impregnation process is carried out under vacuum or under negative pressure. A preferred impregnation solution is an alcoholic solution of a thermosetting phenolic resin having a dynamic viscosity of less than 20 mPa·s.

The curing process comprises drying the impregnated green part at room temperature for 1.5 to 3 h, and then drying at 80° C. Thereafter, the green part is transferred to a carbonization furnace, kept at 110° C. to 130° C. for 1 to 2 h, then at 145° C. to 165° C. for 0.5 to 1.5 h, and heated to 180° C. to 190° C. and kept for 2 to 4 h. Then, under the protection of argon, the temperature is raised to 550° C. at a rate of 2° C./min and kept for 0.5-1 h. The temperature is raised to 800° C. to 1000° C. at a rate of 2° C./min, and after 1 to 2 h of heat preservation, the furnace is cooled.

In the disclosure, the C/C porous body has a density of 0.7 to 1.1 g/cm$^3$ and an open porosity of 30 to 50%.

(d) In a vacuum graphite resistance furnace, the C/C porous body is subject to a melt-siliconization reaction and a high-temperature silicon removal process, so that a primary C/C-SiC composite material is obtained. The primary C/C-SiC composite is densified by chemical vapor infiltration to obtain the final C/C-SiC part.

The interior of the C/C-SiC composite material obtained by siliconization usually contains silicon that is not consumed in the reaction. The residual silicon needs to be removed otherwise it will affect the chemical stability and high-temperature mechanical properties of the part.

The process conditions of the siliconization reaction and the silicon removal are as follows: maintaining the vacuum degree in the resistance furnace at 10 to 30 Pa, raising the temperature to 1600° C., holding for one hour for the siliconizing reaction, and then raising the temperature to 2000° C. or more to remove the residual silicon.

After the residual silicon is removed, the C/C-SiC composite material contains some pores. The primary C/C-SiC parts are further densified via a chemical vapor infiltration treatment. The chemical vapor infiltration method can refer to the parameters in the prior art, and specific conditions are not described herein.

The disclosure is further elaborated in conjunction with the process flow of the sole figure and the following various examples.

Example 1

(a) 1000 g of thermoplastic phenolic resin containing 7 wt. % of urotropine was dissolved in 1000 g of acetone solution; 5770 g of short carbon fiber powders having a length of 50 to 200 μm were added to the above solution, and the carbon fiber powders were uniformly dispersed by ultrasonication; then, the mixture was heated, distilled, and crystallized to obtain a powder aggregate; the powder aggregate was dried, ground, and sieved, and the carbon fiber composite powders having an average particle diameter of 10 to 80 μm uniformly coated with a phenol resin were obtained, where the volume percentage of the phenol resin was 20% in the composite powders.

(b) According to the CAD model of the designed part, the corresponding carbon fiber green part was formed by the 3D printing process. The process parameters of the 3DP were as follows: the binder consisted of 70% absolute ethanol, 28% deionized water and 2% polyethylene glycol 400. The thickness of the paving layer was 0.1 mm, and the scanning was performed once to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 1.5 h, and then drying at 80° C. The green part was transferred to a carbonization furnace, kept at 110° C. for 1 h, then at 145° C. for 0.5 h, and heated to 180° C. and kept for 2 h to complete the curing reaction. Then, under the protection of argon, the temperature was raised to 550° C. at a rate of 2° C./min and kept for 0.5 h. Finally, the temperature was raised to 800° C. at a rate of 2° C./min, and kept for 1 h, the furnace was cooled to complete the carbonization. The obtained C/C porous body had a density of 0.72 g/cm$^3$ and an open porosity of 47.6%.

(d) The C/C porous body was placed in a graphite crucible coated with boron nitride, and the degree of vacuum in the resistance furnace was controlled at 20 Pa. The Si powder, the addition amount of which was twice the theoretical amount, was placed on the porous body. The temperature was raised to 400° C. and kept for 1 h; the temperature was further raised to 750° C. and kept for 1 h; then the temperature was raised to 1250° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

Example 2

(a) 1000 g of thermoplastic phenolic resin containing 8 wt. % of urotropine was dissolved in 1000 g of acetone solution; 3366 g of short carbon fiber powders having a length of 50 to 200 μm were added to the above solution, and the carbon fiber powders were uniformly dispersed by ultrasonication. Then, the mixture was heated, distilled, and crystallized to obtain a powder aggregate; the powder aggregate was dried, ground, and sieved, and the carbon fiber composite powders having an average particle diameter of 10 to 100 μm uniformly coated with a phenol resin were obtained, where the volume percentage of the phenol resin was 30% in the composite powders.

(b) According to the CAD model of the designed part, the corresponding carbon fiber green part was formed by the 3D printing process. The process parameters of the 3DP were as follows: the binder consisted of 75% absolute ethanol, 23% deionized water and 2% polyethylene glycol 400. The thickness of the power layer was 0.1 mm, and the scanning was performed once to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 2 h, and then drying at 80° C. The green part was transferred to a carbonization furnace, kept at 120° C. for 1 h, then at 150° C. for 0.5 h, and heated to 190° C. and kept for 2 h to complete the curing reaction. Then, under the protection of argon, the temperature was raised to 550° C. at a rate of 2° C./min and kept for 0.5 h. Finally, the temperature was raised to 900° C. at a rate of 2° C./min, and kept for 1 h, the furnace was cooled to complete the carbonization. The obtained C/C porous body had a density of 0.799 g/cm$^3$ and an open porosity of 45.1%.

(d) The C/C porous body was placed in a graphite crucible coated with boron nitride, and the degree of vacuum in the resistance furnace was controlled at 20 Pa. The Si powder, the addition amount of which was twice the theoretical amount, was placed on the porous body. The temperature was raised to 450° C. and kept for 1 h; the temperature was further raised to 800° C. and kept for 1 h; then the temperature was raised to 1300° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

Example 3

(a) 1000 g of thermoplastic phenolic resin containing 7 wt. % of urotropine was dissolved in 1000 g of acetone solution; 2164 g of short carbon fiber powders having a length of 50 to 200 μm were added to the above solution, and the carbon fiber powders were uniformly dispersed by ultrasonication. Then, the mixture was heated, distilled, and crystallized to obtain a powder aggregate; the powder aggregate was dried, ground, and sieved, and the carbon fiber composite powders having an average particle diameter of 10 to 80 μm uniformly coated with a phenol resin were obtained, where the volume percentage of the phenol resin was 40% in the composite powders.

(b) According to the CAD model of the designed part, the corresponding carbon fiber green part was formed by the SLS process. The process parameters of the SLS were as follows: the laser power was 16 W, the scanning rate was 3500 mm/s, the scanning pitch was 0.15 mm, the thickness of the power layer was 0.12 mm, and the preheating temperature was 60° C. to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 3 h, and then drying at 80° C. The green part was transferred to a carbonization furnace, kept at 120° C. for 2 h, then at 165° C. for 1 h, and heated to 190° C. and kept for 4 h to complete the curing reaction. Then, under the protection of argon, the temperature was raised to 550° C. at a rate of 2° C./min and kept for 0.5 h. Finally, the temperature was raised to 1000° C. at a rate of 2° C./min, and kept for 1 h, the furnace was cooled to complete the carbonization. The obtained C/C porous body had a density of 0.82 g/cm$^3$ and an open porosity of 43.2%.

(d) The C/C porous body was placed in a graphite crucible coated with boron nitride, and the degree of vacuum in the resistance furnace was controlled at 2.0 Pa. The Si powder, the addition amount of which was twice the theoretical amount, was placed on the porous body. The temperature was raised to 450° C. and kept for 1 h; the temperature was further raised to 800° C. and kept for 1 h; then the temperature was raised to 1300° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

Example 4

(a) 1000 g of thermoplastic phenolic resin containing 7 wt. % of urotropine was dissolved in 1000 g of acetone solution; 1442 g of short carbon fiber powders having a length of 50 to 200 μm were added to the above solution, and the carbon fiber powders were uniformly dispersed by ultrasonication. Then, the mixture was heated, distilled, and crystallized to obtain a powder aggregate; the powder aggregate was dried, ground, and sieved, and the carbon fiber composite powders having an average particle diameter of 10 to 150 μm uniformly coated with a phenol resin were obtained, where the volume percentage of the phenol resin was 50% in the composite powders.

(b) According to the CAD model of the designed part, the corresponding carbon fiber green part was formed by the 3DP process. The process parameters of the 3DP were as follows: the laser power was 16 W, the scanning rate was 3500 mm/s, the scanning pitch was 0.15 mm, the thickness of the power layer was 0.12 mm, and the preheating temperature was 60° C. to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 3 h, and then drying at 80° C. The green part was transferred to a carbonization furnace, kept at 120° C. for 2 h, then at 165° C. for 1 h, and heated to 190° C. and kept for 4 h to complete the curing reaction. Then, under the protection of argon, the temperature was raised to 550° C. at a rate of 2° C./min and kept for 0.5 h. Finally, the temperature was raised to 1000° C. at a rate of 2° C./min, and kept for 1 h, the furnace was cooled to complete the carbonization. The obtained C/C porous body had a density of 0.91 g/cm³ and an open porosity of 38.5%.

(d) The C/C porous body was placed in a graphite crucible coated with boron nitride, and the degree of vacuum in the resistance furnace was controlled at 20 Pa. The Si powder, the addition amount of which was twice the theoretical amount, was placed on the porous body. The temperature was raised to 450° C. and kept for 1 h; the temperature was further raised to 800° C. and kept for 1 h; then the temperature was raised to 1300° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

Example 5

(a) 1000 g of thermoplastic phenolic resin containing 9 wt. % of urotropine was dissolved in 1000 g of acetone solution; 962 g of short carbon fiber powders having a length of 50 to 200 μm were added to the above solution, and the carbon fiber powders were uniformly dispersed by ultrasonication. Then, the mixture was heated, distilled, and crystallized to obtain a powder aggregate; the powder aggregate was dried, ground, and sieved, and the carbon fiber composite powders having an average particle diameter of 10 to 100 μm uniformly coated with a phenol resin were obtained, where the volume percentage of the phenol resin was 60% in the composite powders.

(b) According to the CAD model of the designed part, the corresponding carbon fiber green part was formed by the SLS process. The process parameters of the SLS were as follows: The laser power was 12 W, the scanning rate was 2500 mm/s, the scanning pitch was 0.12 mm, the thickness of the power layer was 0.1 mm, and the preheating temperature was 60° C. to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 3 h, and then drying at 80° C. The green part was transferred to a carbonization furnace, kept at 130° C. for 2 h, then at 160° C. for 1 h, and heated to 190° C. and kept for 4 h to complete the curing reaction. Then, under the protection of argon, the temperature was raised to 550° C. at a rate of 2° C./min and kept for 0.5 h. Finally, the temperature was raised to 950° C. at a rate of 2° C./min, and kept for 1 h, the furnace was cooled to complete the carbonization. The obtained C/C porous body had a density of 0.99 g/cm³ and an open porosity of 36.1%.

(d) The C/C porous body was placed in a graphite crucible coated with boron nitride, and the degree of vacuum in the resistance furnace was controlled at 20 Pa. The Si powder, the addition amount of which was twice the theoretical amount, was placed on the porous body. The temperature was raised to 500° C. and kept for 1 h; the temperature was further raised to 850° C. and kept for 1 h; then the temperature was raised to 1350° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

Example 6

(a) 1000 g of thermoplastic phenolic resin containing 10 wt. % of urotropine was dissolved in 1000 g of acetone solution; 361 g of short carbon fiber powders having a length of 50 to 200 μm were added to the above solution, and the carbon fiber powders were uniformly dispersed by ultrasonication. Then, the mixture was heated, distilled, and crystallized to obtain a powder aggregate; the powder aggregate was dried, ground, and sieved, and the carbon fiber composite powders having an average particle diameter of 10 to 150 μm uniformly coated with a phenol resin were obtained, where the volume percentage of the phenol resin was 80% in the composite powders.

(b) According to the CAD model of the designed part, the corresponding carbon fiber green part was formed by the 3DP process. The process parameters of the 3DP were as follows: The laser power was 16 W, the scanning rate was 3500 mm/s, the scanning pitch was 0.15 mm, the thickness of the power layer was 0.12 mm, and the preheating temperature was 60° C. to form a carbon fiber green part.

(c) Preparing an alcohol solution containing 50% by mass of thermosetting phenolic resin, which had a dynamic viscosity of 20 mPa·s. The carbon fiber green part was impregnated in a vacuum impregnation machine; drying the impregnated green part at room temperature for 3 h, and then drying at 80° C. The green part was transferred to a carbonization furnace, kept at 120° C. for 2 h, then at 165° C. for 1 h, and heated to 190° C. and kept for 4 h to complete the curing reaction. Then, under the protection of argon, the temperature was raised to 550° C. at a rate of 2° C./min and kept for 0.5 h. Finally, the temperature was raised to 1000° C. at a rate of 2° C./min, and kept for 1 h, the furnace was cooled to complete the carbonization. The obtained C/C porous body had a density of 1.08 g/cm$^3$ and an open porosity of 34.6%.

(d) The C/C porous body was placed in a graphite crucible coated with boron nitride, and the degree of vacuum in the resistance furnace was controlled at 20 Pa. The Si powder, the addition amount of which was twice the theoretical amount, was placed on the porous body. The temperature was raised to 450° C. and kept for 1 h; the temperature was further raised to 800° C. and kept for 1 h; then the temperature was raised to 1300° C. for 1 h; finally, the temperature was raised to 1600° C. and maintained for 1 h to complete the melt-siliconizing reaction. Then heating to 2000° C. to remove residual silicon for obtaining a primary C/C-SiC composite material. The primary C/C-SiC composite material was densified by a chemical vapor infiltration method, and chloroform and hydrogen were introduced at 1200° C., followed by reaction for 1 h to obtain a final C/C-SiC part.

It will be obvious to those skilled in the art that changes and modifications may be made, and therefore, the aim in the appended claims is to cover all such changes and modifications.

What is claimed is:

1. A method, comprising:
    (a) preparing, using a solvent evaporation process, carbon fiber composite powders coated with a phenol resin;
    (b) according to a three-dimensional model of a to-be-prepared part, forming a green part corresponding to the to-be-prepared part using the carbon fiber composite powders and a 3D printing technology;
    (c) densifying the green part to yield a C/C porous body having a density of 0.7 to 1.1 g/cm$^3$ and an open porosity of 30 to 50%; and
    (d) siliconizing the C/C porous body under vacuum, removing excess silicon to yield a primary carbon fiber reinforced carbon-silicon carbide (C/C-SiC) body, densifying the primary C/C-SiC body, to obtain a final C/C-SiC composite part.

2. The method of claim 1, wherein the solvent evaporation process in (a) is carried out as follows:
    (a1) dissolving a thermoplastic phenol resin comprising 7-10 wt. % of a curing agent in an organic solvent, adding carbon fiber powders to the organic solvent to yield a dispersed solution; where a volume ratio of the carbon fiber powders to the phenolic resin is (2-8):(2-8); and
    (a2) distilling the dispersed solution and crystallizing to yield a powder aggregate, and drying, grinding and sieving the powder aggregate to yield the carbon fiber composite powders.

3. The method of claim 2, wherein the carbon fiber powders in (a1) has a diameter of 6 to 10 μm and a length of 50 to 200 μm.

4. The method of claim 1, wherein a particle size of the carbon fiber composite powders is between 10 and 150 μm.

5. The method of claim 3, wherein a particle size of the carbon fiber composite powders is between 10 and 150 μm.

6. The method of claim 1, wherein the 3D printing technology in (b) is a powder bed-based 3D printing technique including selective laser sintering (SLS) technique and three-dimensional printing (3DP) technique.

7. The method of claim 5, wherein the 3D printing technology in (b) is a powder bed-based 3D printing technique including selective laser sintering (SLS) technique and three-dimensional printing (3DP) technique.

8. The method of claim 1, wherein densifying the green part in (c) comprises impregnation, curing and carbonization; the impregnation is carried out under vacuum or under negative pressure, and the impregnation liquid is a thermosetting phenolic resin or a furan resin liquid having a dynamic viscosity of less than 50 mPa·s, or an alcohol solution of a thermosetting phenolic resin having a dynamic viscosity of less than 20 mPa·s.

9. The method of claim 7, wherein densifying the green part in (c) comprises impregnation, curing and carbonization; the impregnation is carried out under vacuum or under negative pressure, and the impregnation liquid is a thermosetting phenolic resin or a furan resin liquid having a dynamic viscosity of less than 50 mPa·s, or an alcohol solution of a thermosetting phenolic resin having a dynamic viscosity of less than 20 mPa·s.

10. The method of claim 1, wherein the densifying the C/C porous body in (d) comprises depositing SiC in pores formed in the process of removal of silicon by a chemical vapor infiltration method.

11. The method of claim 9, wherein the densifying the C/C porous body in (d) comprises depositing SiC in pores formed in the process of removal of silicon by a chemical vapor infiltration method.

12. A carbon fiber reinforced carbon-silicon carbide (C/C-SiC) composite part produced by the method of claim 1.

* * * * *